United States Patent
Pelliconi et al.

(10) Patent No.: US 7,728,077 B2
(45) Date of Patent: Jun. 1, 2010

(54) POLYOLEFIN MASTERBATCH AND COMPOSITION SUITABLE FOR INJECTION MOLDING

(75) Inventors: Anteo Pelliconi, S. Maria Maddalena (IT); Enea Garagnani, Ferrara (IT); Giampaolo Pellegatti, Baura (IT); Antonella Angelini, Cocomaro di Cona (IT)

(73) Assignee: Basell Pololefine Italia s.r.l., Milan (IT)

( * ) Notice: Subject to any disclaimer, the term of this patent is extended or adjusted under 35 U.S.C. 154(b) by 657 days.

(21) Appl. No.: 11/578,681

(22) PCT Filed: Mar. 22, 2005

(86) PCT No.: PCT/EP2005/003027

§ 371 (c)(1),
(2), (4) Date: Oct. 17, 2006

(87) PCT Pub. No.: WO2005/103140

PCT Pub. Date: Nov. 3, 2005

(65) Prior Publication Data

US 2007/0232765 A1    Oct. 4, 2007

Related U.S. Application Data

(60) Provisional application No. 60/569,144, filed on May 7, 2004.

(30) Foreign Application Priority Data

Apr. 27, 2004    (EP) .................................. 04009960

(51) Int. Cl.
C08L 23/00    (2006.01)
C08L 23/04    (2006.01)
C08L 23/10    (2006.01)
C08L 23/12    (2006.01)

(52) U.S. Cl. ......................... 525/191; 525/53; 525/240
(58) Field of Classification Search ................ 525/191, 525/240, 52, 53, 54, 242, 324
See application file for complete search history.

(56) References Cited

U.S. PATENT DOCUMENTS

| | | |
|---|---|---|
| 4,399,054 A | 8/1983 | Ferraris et al. |
| 5,145,819 A | 9/1992 | Winter et al. |
| 5,324,800 A | 6/1994 | Welborn, Jr. et al. |

FOREIGN PATENT DOCUMENTS

| | | |
|---|---|---|
| EP | 45977 | 2/1982 |
| EP | 129368 | 12/1984 |
| EP | 416815 | 3/1991 |
| EP | 420436 | 3/1991 |
| EP | 485823 | 5/1992 |
| EP | 643066 | 3/1995 |
| EP | 671404 | 9/1995 |
| EP | 674991 | 10/1995 |
| WO | 91/04257 | 4/1991 |
| WO | 00/26295 | 1/2000 |
| WO | 02/28958 | 4/2002 |
| WO | 03/076508 | 9/2003 |
| WO | WO-03076511 A1 * | 9/2003 |

* cited by examiner

*Primary Examiner*—Irina S Zemel
*Assistant Examiner*—Jeffrey Lenihan
(74) *Attorney, Agent, or Firm*—Jarrod N. Raphael

(57) ABSTRACT

A masterbatch composition comprising (percent by weight): A) 15%-50% of a polypropylene component having a melt flow rate of from 1 to 250 g/10 min.; and B) 50%-85% of an olefin polymer partially soluble in xylene at room temperature, containing from 60% to 85% by weight of ethylene; said masterbatch composition having (i) a value of the intrinsic viscosity [η] of the fraction soluble in xylene at room temperature ($[\eta]_{sol}$) equal to or lower than 2.9 dl/g, and (ii) a value of the ratio MFR/[η], , , , equal to or lower than 4, is added to polyolefin materials to obtain final compositions suitable for injection molding.

11 Claims, No Drawings

POLYOLEFIN MASTERBATCH AND COMPOSITION SUITABLE FOR INJECTION MOLDING

The present invention relates to a polyolefin masterbatch which can be used to prepare polyolefin compositions suitable for injection molding into relatively large articles. More particularly, the polyolefin compositions can be injection molded into large objects which exhibit low values of thermal shrinkage in combination with enhanced mechanical properties, like impact strength and elongation at break.

An advantage of using a masterbatch composition is that it can be added to many and different kinds of polyolefins to achieve a final polyolefin composition ready for production, by injection molding, of large articles such as automobile bumpers. Thus there is a constant need for masterbatch compositions able to produce, by blending with various polyolefin materials, final compositions exhibiting a good balance of properties. In particular, the reduction of thermal shrinkage imparts a higher dimensional stability to the final articles.

In WO 00/26295 polyolefin compositions with low values of coefficient of linear thermal expansion and good mechanical properties are described, comprising (by weight) from 40 to 60% of a broad molecular weight distribution propylene polymer having a polydispersity index from 5 to 15 and melt flow rate of from 80 to 200 g/10 min (according to ASTM-D 1238, condition L), and from 40 to 60% of a partially xylene-soluble olefin polymer rubber containing at least 65% by weight of ethylene, the $IV_S/IV_A$ ratio between the intrinsic viscosity ($IV_S$) of the portion soluble in xylene of the polyolefin composition at room temperature and the intrinsic viscosity ($IV_A$) of the said propylene polymer ranging from 2 to 2.5.

These compositions typically have a flexural modulus of from 650 to 1000 MPa.

In European patent application No. 03018013, corresponding to U.S. provisional application No. 60/496,579, polyolefin compositions having flexural modulus values of higher than 1000 MPa, in particular higher than 1100 MPa, still maintaining a good balance of overall mechanical properties and low values of thermal shrinkage are described, comprising (percentage by weight):

A) from 60 to 85%, of a broad molecular weight distribution propylene polymer (component A) having a polydispersity index from 5 to 15 and melt flow rate of from 20 to 78 g/10 min, and B) from 15 to 40 of a partially xylene-soluble olefin polymer rubber (component B) containing at least 65% by weight of ethylene.

It has now been found that by properly selecting the ratio between the melt flow rate values of the overall composition and the intrinsic viscosity values of the xylene-soluble portion of the overall composition, in combination with other features relating to the composition and the proportions of the components, it is possible to obtain a masterbatch composition with a particularly valuable set of physical and mechanical properties and particularly suited for preparing final polyolefin compositions having excellent dimensional stability.

In particular, by using the masterbatch compositions of the present invention, it is possible to obtain final compositions having flexural modulus values of higher than 1000 MPa, with very low values of thermal shrinkage.

Thus the present invention relates to a masterbatch composition comprising (percent by weight):

A) 15%-50%, preferably 20-40%, of a polypropylene component having a melt flow rate of from 1 to 250 g/10 min., preferably from 5 to 200 g/10 min., in particular from 10 to 180 g/10 min.; and B) 50%-85%, preferably 60-80%, of an olefin polymer partially soluble in xylene at room temperature (about 25° C.), containing from 55% to 85%, preferably from 60% to 80% by weight of ethylene;

said masterbatch composition having (i) a value of the intrinsic viscosity [η] of the fraction soluble in xylene at room temperature ($[\eta]_{sol}$) equal to or lower than 2.9 dl/g, preferably equal to or lower than 2.8 dl/g, in particular from 0.9 to 2.7 dl/g, more preferably from 1.2 to 2.7 dl/g, and (ii) a value of the ratio MFR/$[\eta]_{sol}$ of the melt flow rate (MFR) value (of the total composition) to the [η] value of the fraction soluble in xylene at room temperature, equal to or lower than 4, preferably equal to or lower than 3.8.

The melt flow rate values (MFR) are measured according to ASTM-D 1238, condition L (230° C., with 2.16 kg load).

The melt flow rate of the masterbatch composition can preferably range from 0.1 to 15 g/10 min., more preferably from 0.1 to 10 g/10 min.

Component (A) is preferably a crystalline propylene homopolymer or a crystalline copolymer of propylene with one or more comonomers selected from ethylene and $C_4$-$C_{10}$ α-olefins, or a mixture thereof. Ethylene is the preferred comonomer. The comonomer content is preferably of from 0.5 to 3.5% by weight, more preferably from 0.5 to 2.5% by weight.

The content of fraction of component (A) which is soluble in xylene at room temperature is typically equal to or lower than 10%, preferably equal to or lower than 5% by weight. Such values of xylene-soluble content correspond to isotactic index values equal to or higher than 90%, preferably equal to or higher than 95%.

The component (B) used in the masterbatch composition of the present invention can be a copolymer of ethylene with propylene and/or $C_4$-$C_{10}$ α-olefins. It can optionally further contain a diene, the content of which is preferably of from 1 to 10% by weight, more preferably from 1 to 5% by weight.

As previously said, component (B) is partially soluble in xylene at room temperature. The content of fraction of component (B) which is soluble in xylene at room temperature is preferably of about 50-80% by weight, more preferably 50-75% by weight.

Illustrative $C_4$-$C_{10}$ α-olefins that can be present in (A) and (B) include 1-butene, 1-pentene, 1-hexene, 4-methyl-1-pentene and 1-octene, with 1-butene being particularly preferred.

Other preferred features for the masterbatch composition of the present invention are:

ethylene content, with respect to the total weight of the composition, from 30% to 60% by weight, in particular from 40% to 60% by weight;

amount of fraction soluble in xylene at room temperature of the overall composition from 35% to 60% by weight.

The masterbatch composition of the present invention can be prepared by a sequential polymerization, comprising at least two sequential steps, wherein components (A) and (B) are prepared in separate subsequent steps, operating in each step, except the first step, in the presence of the polymer formed and the catalyst used in the preceding step. The catalyst is added only in the first step, however its activity is such that it is still active for all the subsequent steps.

The polymerization, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the polymerization steps are not critical, however it is best if the temperature is from 50 to 100° C. The pressure can be atmospheric or higher.

The regulation of the molecular weight is carried out by using known regulators, hydrogen in particular.

The masterbatch compositions of the present invention can also be produced by a gas-phase polymerisation process carried out in at least two interconnected polymerisation zones. The said type of process is illustrated in European patent application 782 587.

In detail, the above-mentioned process comprises feeding one or more monomer(s) to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

This process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The said polymerizations are preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an isotactic index equal to or greater than 93%, preferably equal to or greater than 95%. Catalysts having the above mentioned characteristics are well known in the patent literature; particularly advantageous are the catalysts described in U.S. Pat. No. 4,399,054 and European patent 45977.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phthalic acid esters, such as diisobutyl, dioctyl, diphenyl and benzylbutyl phthalate.

Other electron-donors particularly suitable are 1,3-diethers of formula:

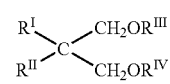

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said dieters are 2-methyl-2-isopropyl-1,3-dimethoxypropane, 2,2-diisobutyl- 1,3-diinethoxypropane, 2-isopropyl-2-cyclopentyl- 1,3-dimethoxypropane, 2-isopropyl-2-isoamyl-1,3-dimethoxypropane, 9,9-bis (methoxymethyl) fluorene.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiC_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert\text{-}butyl)_2Si(OCH_3)_2$, $(cyclohexyl)(methyl)Si(OCH3)_2$, $(phenyl)_2Si(OCH_3)_2$ and $(cyclopentyl)_2Si(OCH_3)_2$. 1,3-diethers having the formulae described above can also be used advantageously. If the internal donor is one of these dieters, the external donors can be omitted.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the component (B).

The catalysts can be pre-contacted with small amounts of olefins (prepolymerization).

The masterbatch composition of the present invention can also contain additives commonly employed in the art, such as antioxidants, light stabilizers, heat stabilizers, colorants and fillers.

As previously said, the masterbatch composition of the present invention can be advantageously compounded with additional polyolefins, in particular propylene polymers such as propylene homopolymers, random copolymers, and thermoplastic elastomeric polyolefin compositions. Accordingly, a second embodiment of the invention relates to a thermoplastic polyolefin composition suitable for injection molding, containing the above-defined masterbatch compositions. Preferably, the said thermoplastic polyolefin composition comprises up to 60% by weight, typically from 20% to 60% by weight, more preferably from 25% to 55% by weight of the masterbatch composition according to the present invention.

Practical examples of the polyolefins to which the masterbatch is added (i.e. the polyolefins other than those present in the masterbatch) are the following polymers:

1) crystalline propylene homopolymers, in particular isotactic or mainly isotactic homopolymers;
2) crystalline propylene copolymers with ethylene and/or a $C_4$-$C_{10}$ α-olefin, wherein the total comonomer content ranges from 0.05 to 20% by weight with respect to the weight of the copolymer, and wherein preferred α-olefins are 1-butene; 1-hexene; 4-methyl-1-pentene and 1-octene;
3) crystalline ethylene homopolymers and copolymers with propylene and/or a $C_4$-$C_{10}$ α-olefin, such as HDPE;
4) elastomeric copolymers of ethylene with propylene and/or a $C_4$-$C_{10}$ α-olefins, optionally containing minor quantities of a diene, such as butadiene, 1,4-hexadiene, 1,5-hexadiene and ethylidene-1-norbornene, wherein the diene content is typically from 1 to 10% by weight;
5) a thermoplastic elastomeric composition comprising one or more of propylene homopolymers and/or the copolymers of item 2) and an elastomeric moiety comprising one or more of the copolymers of item 4), typically prepared according to known methods by mixing the components in the molten state or by sequential polymerization, and generally containing the said elastomeric moiety in quantities from 5 to 80% by weight.

The polyolefin composition may be manufactured by mixing the masterbatch composition and the additional polyolefin(s) together, extruding the mixture, and pelletizing the resulting composition using known techniques and apparatus.

The polyolefin composition may also contain conventional additives such as mineral fillers, colorants and stabilizers. Mineral fillers that can be included in the composition include talc, $CaCO_3$, silica, such as wollastonite ($CaSiO_3$), clays, diatomaceaous earth, titanium oxide and zeolites. Typically the mineral filler is in particle form having an average diameter ranging form 0.1 to 5 micrometers.

The present invention also provides final articles, such as bumpers and fascia, made of the said polyolefin composition.

The practice and advantages of the present invention are disclosed below in the following examples. These Examples are illustrative only, and are not intended to limit the scope of the invention in any manner whatsoever.

The following analytical methods are used to characterize the polymer compositions.

Melt Flow Rate: ASTM-D 1238, condition L.

[η] intrinsic viscosity: determined in tetrahydronaphtalene at 135° C.

Ethylene content: I.R. Spectroscopy.

Flexural Modulus: ISO 178, measured 24 hours after moulding.

Tensile strength at yield: ISO 527, measured 24 hours after moulding.

Tensile strength at break: ISO 527, measured 24 hours after moulding.

Elongation at break and at yield: ISO 527, measured 24 hours after moulding.

Notched IZOD impact test: ISO 180/1A

The IZOD values are measured at 23° C. and −30° C., 3 hours and 24 hours after moulding, and at −50° C., 24 hours after moulding.

Xylene Soluble and Isoluble Fractions 2.5 g of polymer and 250 $cm^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 $cm^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Longitudinal and Transversal Thermal Shrinkage

A plaque of 100×200×2.5 mm is moulded in an injection moulding machine "SANDRETTO serie 7 190" (where 190 stands for 190 tons of clamping force).
The injection conditions are:
melt temperature=250° C.;
mould temperature=40° C.;
injection time=8 seconds;
holding time=22 seconds;
screw diameter=55 mm.

The plaque is measured 3 hours and 24 hours after moulding, through callipers, and the shrinkage is given by:

$$\text{Longitudinal shrinkage} = \frac{200 - \text{read\_value}}{200} \times 100$$

$$\text{Transversal shrinkage} = \frac{100 - \text{read\_value}}{100} \times 100$$

wherein 200 is the length (in mm) of the plaque along the flow direction, measured immediately after moulding;
100 is the length (in mm) of the plaque crosswise the flow direction, measured immediately after moulding;
the read_value is the plaque length in the relevant direction.

EXAMPLES 1-7

Preparation of the Masterbatch Composition

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 15 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization

Into a first gas phase polymerization reactor a polypropylene homopolymer (component (A)) is produced by feeding in a continuous and constant flow the prepolymerized catalyst system, hydrogen (used as molecular weight regulator) and propylene in the gas state.

Polymerization conditions are shown in Table I.

The polypropylene homopolymer coming from the first reactor is discharged in a continuous flow and, after having been purged of unreacted monomers, is introduced, in a continuous flow, into a second gas phase reactor, together with quantitatively constant flows of hydrogen and ethylene in the gas state.

In the second reactor a propylene/ethylene copolymer (component (B)) is produced. Polymerization conditions, molar ratio of the reactants and composition of the copolymers obtained are shown in Table I.

The polymer particles exiting the second reactor, which constitute the not stabilized masterbatch according to the present invention, are subjected to a steam treatment to remove the reactive monomers and volatile substances, and then dried.

Then the polymer particles are introduced in a rotating drum, where they are mixed with 0.05% by weight of paraffin oil ROL/OB 30 (having a density of 0.842 kg/l at 20° C. according to ASTM D 1298 and flowing point of −10° C. according to ASTM D 97), 0.15% by weight of Irganox® B 215 (made of about 34% Irganox® 1010 and 66% Irgafos® 168) and 0.04% by weight of DHT-4A (hydrotalcite).

The said Irganox 1010 is 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos 168 is tris(2,4-di-tert.-butylphenyl) phosphite.

Then, the polymer particles are extruded under nitrogen in a screw extruder with a melt temperature of 200-250° C.

The characteristics relating to this polymer composition, reported in Table II, are obtained from measurements carried out on the so extruded polymer, which constitute the stabilized masterbatch composition according to the present invention.

TABLE I

| | EXAMPLE | | | | | | |
|---|---|---|---|---|---|---|---|
| | 1 | 2 | 3 | 4 | 5 | 6 | 7 |
| 1° REACTOR (component (A)) | | | | | | | |
| Temperature (° C.) | 75 | 75 | 75 | 75 | 75 | 75 | 75 |
| Amount produced (wt %) | 31 | 31 | 33 | 30 | 30 | 30 | 25 |
| MFR$_A$ (g/10 min.) | 146 | 86 | 87 | 78 | 107 | 81 | 19.8 |
| Xylene soluble (wt %) | 3.6 | 3.6 | 3.5 | 3.5 | 3.5 | 3.5 | 3.3 |
| 2° REACTOR (component (B)) | | | | | | | |
| Temperature (° C.) | 65 | 65 | 65 | 65 | 65 | 65 | 65 |
| Amount produced (wt %) | 69 | 69 | 67 | 70 | 70 | 70 | 75 |
| C2/(C2 + C3) mol | 0.58 | 0.58 | 0.58 | 0.645 | 0.635 | 0.63 | 0.6 |
| C2 in (B) (wt %) | 69.5 | 67 | 69 | 75.5 | 73.5 | 72 | 66.5 |
| Xylene soluble in (B) (wt %) | 65.5 | 68 | 66 | 57 | 59 | 61.5 | 69.5 |

Notes:
C2 = ethylene; C3 = propylene

TABLE II

| | EXAMPLE | | | | | | |
|---|---|---|---|---|---|---|---|
| | 1 | 2 | 3 | 4 | 5 | 6 | 7 |
| MFR (g/10 min) | 4.2 | 4.2 | 4.9 | 4.2 | 5.2 | 5.6 | 2 |
| Xylene soluble (wt %) | 46.4 | 48.2 | 45.6 | 41.1 | 42.5 | 44 | 53.1 |
| Ethylene content (wt %) | 48 | 46.2 | 46.3 | 52.9 | 51.4 | 50.3 | 50 |
| $[\eta]_{sol}$ (dl/g) | 1.93 | 1.85 | 1.79 | 1.8 | 1.72 | 1.58 | 1.95 |
| Flexural modulus (MPa) | 340 | 338 | 309 | 400 | 350 | 370 | 255 |
| Tensile strength at yield (MPa) | 8 | 8.3 | 8.2 | 9.4 | 8.7 | 8.7 | 7.1 |
| Elongation at yield (% a) | 31.3 | 31.8 | 10.9 | 32.3 | 27.8 | 28.7 | 46 |
| Tensile strength at break (MPa) | >12 | 13 | >10 | >14.9 | >13.7 | 13.2 | >13 |
| Elongation at break (%) | >597 | 597 | >640 | >595 | >600 | 570 | >600 |
| IZOD Impact Str. at −50° C. (KJ/m$^2$) | 86.9 | 41.5 | 88.9 | 25.9 | 23.1 | 46.1 | N.B. |
| MFR/$[\eta]_{sol}$ | 2.2 | 2.3 | 2.7 | 2.3 | 3 | 3.5 | 1 |

Note:
N.B. = No Break

Preparation of Blends of the Stabilized Masterbatch Composition with Propylene Polymers The stabilized masterbatch compositions prepared as described above (hereinafter called SMC) are blended by extrusion under the previously described conditions with a heterophasic polypropylene composition (hereinafter called HPP) and the other additives hereinafter described, in the proportions reported below and in Table III. The properties of the so obtained final compositions are reported in Table III.

| Component | Amount |
|---|---|
| 2 | 1.76% |
| 3 | 0.05% |
| 4 | 0.2% |
| 5 | 20% |

TABLE III

| | SMC of EXAMPLE | | | | | | |
|---|---|---|---|---|---|---|---|
| | 1 | 2 | 3 | 4 | 5 | 6 | 7 |
| SMC amount (wt %) | 43 | 43 | 45 | 43 | 43 | 43 | 33 |
| HPP amount (wt %) | 34.99 | 34.99 | 32.99 | 34.99 | 34.99 | 34.99 | 44.99 |
| Flexural modulus (MPa) | 1217 | 1214 | 1203 | 1250 | 1216 | 1226 | 1490 |
| Tensile strength at yield (MPa) | — | — | — | — | — | — | 16.8 |
| Elongation at yield (% a) | — | — | — | — | — | — | 5.9 |
| Tensile strength at break (MPa) | — | — | — | — | — | — | 13 |
| Elongation at break (%) | — | — | — | — | — | — | 60 |
| IZOD Impact Str. at −30° C. (KJ/m$^2$) | 5.7 | 4.7 | 4.8 | 3.9 | 4.1 | 3.9 | 4.2 |
| Longitudinal shrinkage (%) | 0.33 | 0.34 | 0.34 | 0.37 | 0.36 | 0.35 | 0.45 |
| Transversal shrinkage (%) | 0.48 | 0.49 | 0.49 | 0.53 | 0.51 | 0.49 | 0.63 |
| MFR (g/10 min) | 18 | 17.8 | 18.3 | — | 20.7 | 21.7 | 17.9 |

Added Components

1 HPP: heterophasic polypropylene composition having MFR of 60 g/10 min., made of 80% by weight of propylene homopolymer with isotactic index of 98%, and 20% by weight of an ethylene/propylene copolymer containing 60% by weight of ethylene;

2 CB: carbon black masterbatch having MFR of about 40 g/10 min., made of 40% by weight of carbon black and 20% of a copolymer of propylene with 7% by weight of ethylene;

3 ROL/OB 30: see above;

4 Irganox® B 225: made of about 50% Irganox® 1010 and 50% Irgafos® 168;

5 HM05 talc: fine talc powder with average particle size of about 2 μm.

In all the examples, the added amounts of components 2 to 5 are the following (percent by weight):

The invention claimed is:

1. A masterbatch composition comprising (percent by weight):
   A) 15%-50% of a crystalline propylene homopolymer having a melt flow rate of from 1 to 250 g/10 min.; and
   B) 50%-85% of an olefin polymer partially soluble in xylene at room temperature comprising from 55% to 85% by weight of ethylene;
   said masterbatch composition having an intrinsic viscosity [η] of a fraction soluble in xylene at room temperature ($[\eta]_{sol}$) equal to or lower than 2.7 dl/g, and a ratio of MFR/$[\eta]_{sol}$ value equal to or lower than 4, wherein the MFR is the melt flow rate of the masterbatch composition.

2. The masterbatch composition of claim 1 further having a MFR value of from 0.1 to 15 g/10 min.

3. The masterbatch composition of claim 1 further having a flexural modulus value ranging from 255 MPa to 400 MPa.

4. A thermoplastic polyolefin composition comprising a masterbatch composition comprising (percent by weight):
  A) 15%-50% of a polypropylene component having a melt flow rate of from 1 to 250 g/10 min.; and
  B) 50%-85% of an olefin polymer partially soluble in xylene at room temperature comprising from 55% to 85% by weight of ethylene;

said masterbatch composition having an intrinsic viscosity [η] of a fraction soluble in xylene at room temperature ($[η]_{sol}$) equal to or lower than 2.9 dl/g, and a ratio of MFR/$[η]_{sol}$ value equal to or lower than 4, wherein the MFR is the melt flow rate of the masterbatch composition, and wherein said thermoplastic polyolefin composition has a flexural modulus value higher than 1000 MPa.

5. The thermoplastic polyolefin composition of claim 4, wherein the thermoplastic polyolefin composition comprises from 20% to 60% by weight of the masterbatch composition with respect to a total weight of the thermoplastic composition.

6. The thermoplastic polyolefin composition of claim 4, wherein the thermoplastic polyolefin composition comprises from 25% to 55% by weight of the masterbatch composition with respect to a total weight of the thermoplastic composition.

7. The thermoplastic polyolefin composition of claim 4 further comprising at least one additional olefin polymer other than the olefin polymer partially soluble in xylene at room temperature, wherein the additional olefin polymer is selected from the group consisting of:
  1) at least one crystalline propylene homopolymer;
  2) at least one crystalline copolymer of propylene with ethylene and/or a $C_4$-$C_{10}$ α-olefin, wherein a total comonomer content ranges from 0.05 to 20% by weight with respect to a total weight of the crystalline copolymer of propylene;
  3) at least one crystalline ethylene homopolymer and/or copolymer with propylene and/or at least one $C_4$-$C_{10}$ α-olefin;
  4) at least one elastomeric copolymer of ethylene with propylene and/or at least one $C_4$-$C_{10}$ α-olefin, optionally comprising minor quantities of a diene;
  5) at least one thermoplastic elastomeric composition comprising at least one propylene homopolymer and/or at least one crystalline copolymer of propylene with ethylene and/or a $C_4$-$C_{10}$ α-olefin, wherein a total comonomer content ranges from 0.05 to 20% by weight with respect to a total weight of the crystalline copolymer of propylene, and an elastomeric moiety comprising one or more of at least one elastomeric copolymer of ethylene with propylene and/or at least quantities of a diene, wherein the elastomeric moiety one $C_4$-$C_{10}$ α-olefin, optionally comprising minor quantities of a diene, wherein the elastomeric moiety is in a quantity ranging from 5 to 80% by weight; and
  6) blends of two or more of the polymers or compositions of items 1) to 5).

8. A process for preparing a masterbatch composition comprising (percent by weight):
  A) 15%-50% of a crystalline propylene homopolymer having a melt flow rate of from 1 to 250 g/10 min. ; and
  B) 50%-85% of an olefin polymer partially soluble in xylene at room temperature comprising from 55% to 85% by weight of ethylene;

said masterbatch composition having an intrinsic viscosity [η] of a fraction soluble in xylene at room temperature ($[η]_{sol}$) equal to or lower than 2.7 dl/g, and a ratio of MFR/$[η]_{sol}$ value equal to or lower than 4, wherein the MFR is the melt flow rate of the masterbatch composition; the process comprising a sequential polymerization comprising at least two sequential steps, wherein components (A) and (B) are prepared in separate subsequent steps, and each step, except the first, is carried out in the presence of a catalyst from at least one preceding step and a polymer formed from at least one preceding step.

9. An article comprising a thermoplastic polyolefin composition, the thermoplastic polyolefin composition comprising a masterbatch composition, the masterbatch composition comprising (percent by weight):
  A) 15%-50% of a polypropylene component having a melt flow rate of from 1 to 250 g/10 min.; and
  B) 50%-85% of an olefin polymer partially soluble in xylene at room temperature comprising from 55% to 85% by weight of ethylene;

said masterbatch composition having an intrinsic viscosity [η] of a fraction soluble in xylene at room temperature ($[η]_{sol}$) equal to or lower than 2.9 dl/g, and a ratio of MFR/$[η]_{sol}$ value equal to or lower than 4, wherein the MFR is the melt flow rate of the masterbatch composition, and wherein said thermoplastic polyolefin composition has a flexural modulus value higher than 1000 MPa.

10. The article of claim 9, wherein the article is selected from the group consisting of a bumper, a fascia, and combinations thereof.

11. A masterbatch composition consisting essentially of (percent by weight):
  A) 15%-50% of a polypropylene component having a melt flow rate of from 1 to 250 g/10 min.;
  B) 50%-85% of an olefin polymer partially soluble in xylene at room temperature comprising from 55% to 85% by weight of ethylene; and optionally
  C) at least one additive;

said masterbatch composition having an intrinsic viscosity [η] of a fraction soluble in xylene at room temperature ($[η]_{sol}$) equal to or lower than 2.7 dl/g, and a ratio of MFR/$[η]_{sol}$ value equal to or lower than 4, wherein the MFR is the melt flow rate of the masterbatch composition.

* * * * *